United States Patent [19]

Alfano

[11] 4,322,951

[45] Apr. 6, 1982

[54] CONTROL DEVICE AND METHOD FOR CONSERVING FUEL IN AN ABSORPTION REFRIGERATION SYSTEM

[76] Inventor: Vincent J. Alfano, 15735 James, Southgate, Mich. 48195

[21] Appl. No.: 147,603

[22] Filed: May 7, 1980

[51] Int. Cl.³ .............................................. F25B 15/00
[52] U.S. Cl. ........................................ 62/101; 62/141; 62/148; 62/476
[58] Field of Search ................... 62/141, 148, 476, 101

[56] References Cited

U.S. PATENT DOCUMENTS

| | | | |
|---|---|---|---|
| 3,002,359 | 10/1961 | Miner | 62/148 |
| 3,195,318 | 7/1965 | Miner | 62/148 |
| 3,590,593 | 7/1971 | Miner | 62/148 |
| 3,626,710 | 12/1971 | Porter | 62/148 X |
| 3,837,174 | 9/1974 | Miyagi et al. | 62/148 X |
| 4,090,372 | 5/1978 | Lamb | 62/148 X |
| 4,202,181 | 5/1980 | Lamb | 62/141 |

Primary Examiner—Lloyd L. King
Attorney, Agent, or Firm—Remy J. VanOphem

[57] ABSTRACT

The control system interrupts the pneumatic signal controlling the demand of chilled water by utilizing a dual port direct acting controller to which are fed an outdoor air humidity signal and outdoor air temperature signal. The dual port direct acting controller provides a signal to control the heating source for the chilled water as a function of the outside air temperature and outside air humidity as well as the internal controls of the absorption system. Thus, the control system provides an optimal decision value for the respective climate range of conditions for the control of the heating source thereby reducing the fuel consumption of the absorption refrigeration system.

17 Claims, 2 Drawing Figures

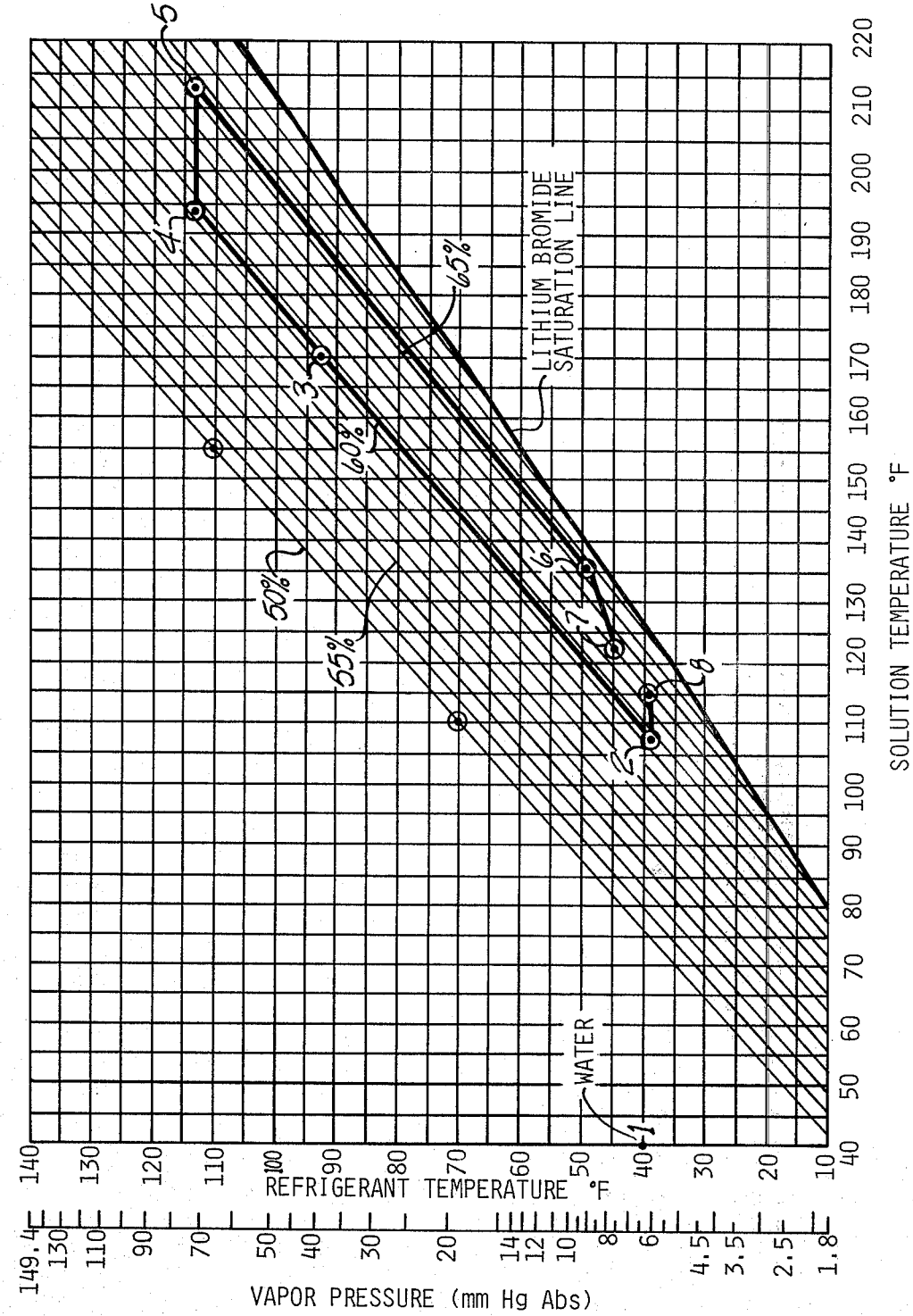

CONTROL DEVICE AND METHOD FOR CONSERVING FUEL IN AN ABSORPTION REFRIGERATION SYSTEM

BACKGROUND OF THE INVENTION

1. Field of the Invention

The present invention relates in general to a method of and means for controlling a refrigeration system and more specifically, a method and means for economizing the operation of an absorption type refrigeration system.

2. Description of the Prior Art

Absorption cold type refrigeration systems for chilling a fluid medium which may then be used to provide refrigeration to any desired location are well known. In a typical absorption refrigeration system, a liquid chilled in an evaporator is circulated to a refrigeration load, such as one or more remotely located air conditioning units or cooling system for an industrial process. Typically, the system comprises a concentrator section, an evaporator section, a condenser section, an absorber section and a heat exchanger. In the concentrator section, heat energy from steam or hot water is used to boil a dilute solution of lithium bromide and water. This boiling results in release of water vapor, and in concentration of the remaining lithium bromide solution. The water, or refrigerant vapor released in the concentrator is drawn into the condenser section. Cooling tower water flowing through the condenser tubes cools and condenses the refrigerant. The refrigerant flows through an orifice into the evaporator section. The pressure in the evaporator section is low, corresponding to a refrigerant saturation temperature of approximately 40° F. The refrigerant is sprayed over a tube bundle containing building system water. The system water gives up heat to the refrigerant, causing it to vaporize. Water is frequently used as the refrigerant, the chilled fluid and the cooling media, and the source of heat in a generator may be steam or hot water circulated in a heating coil. Typically, when the refrigerant is water, the absorbent solution is a hygroscopic brine such as an aqueous solution of lithium bromide or lithium chloride. As is well known, however, a large number of fluids with widely varying characteristics may be used in absorption refrigeration systems.

The refrigerant vapor is drawn to the absorber section by the low pressure resulting from absorption of the refrigerant into the absorbent. In order to expose a large amount of lithium bromide solution surface to the water vapor, the solution is sprayed over the absorber tube bundle. The absorber cooling coil is connected in a cooling circuit which usually also includes the condenser coil conveniently situated in series with the cooling coil. The cooling water is conducted from the condenser coil to a remotely located cooling tower where the heat abstracted in the absorber and in the condenser is rejected to ambient air; that is, the air out-of-doors. Cooling tower water is used in the tube bundle within the absorber section to remove the heat of absorption that is released when the refrigerant vapor returns to the liquid state. The degree of affinity of the absorbent for refrigerant vapor is a function of the absorbent solution concentration and of temperature. The more concentrated the solution, and the cooler the solution, the greater the affinity for refrigerant vapor. Consequentially, the pressure, and thereby the saturation temperature, in the evaporator is controlled by the concentration of lithium bromide solution in the absorber. The concentration of this solution is determined by the amount of heat applied in the concentrator section of the machine. As the absorbent absorbes refrigerant vapor, the solution becomes increasingly dilute. It is necessary to continuously circulate this dilute solution back to the concentrator in order to keep the cycle continuous.

A heat exchanger exchanges heat between the relatively cool, dilute solution being transferred from the absorber to the concentrator section, with a hot, concentrated solution being returned from the concentrator to the absorber. Transferring heat from the concentrated solution to the dilute solution reduces the amount of heat that must be added to bring the dilute solution to a boil. Simultaneously, reducing the temperature of the concentrated solution reduces the amount of heat that must be removed from the absorber section in order to obtain the desired absorber efficiency. Efficient operation of the heat exchanger is extremely important to the economic operation of the lithium bromide water cycle. Typically, absorption refrigeration systems are controlled by providing a temperature sensor which senses the temperature of the fluid medium either as it enters or leaves the evaporator. The signal from the sensor is then used to control the capacity of the refrigeration system in accordance with the load requirements. In an absorption type refrigeration system, this is accomplished by controlling the concentration of the refrigerant-absorbent solution applied to the absorber.

Other control systems, such as those disclosed in U.S. Pat. Nos. 3,099,139 and 3,250,084 employ two separate temperature sensors, one disposed to sense the temperature of the fluid medium entering the refrigeration system, and another to sense the temperature of the fluid medium after it has been cooled by the refrigeration system. However, these control systems, as well as the other prior art control systems known to the applicant, are only adapted to vary the refrigeration capacity of the system in response to varying load conditions and not in response to changes in the internal conditions in the refrigeration system itself. The control system described in U.S. Pat. No. 4,090,372 attempts to solve this problem by providing means disposed for sensing variations in the temperature of the fluid medium both as it enters and leaves the evaporator and for sensing variations in the temperature in the absorber. This sensing means provides first, second and third tracking signal outputs indicative of the sense temperature variations, the first tracking signal output being indicative of the variations in temperature of the fluid medium at the evaporator inlet, the second tracking signal output being indicative of the variations in temperature of the fluid medium at the evaporator outlet and the third tracking signal output signal being indicative of the variations in temperature within the absorber. Comparator means are utilized for comparing the signals and providing a first control signal output indicative of the selected tracking signal. A second control signal output is generated dependent on the relative values of the second tracking signal and the first control signal. The first and second tracking signal outputs are also operatively connected to a difference means which provides a third control signal output indicative of the difference between the first and second tracking signals. The control system also includes a second comparator means operatively connected to the second and third control signal outputs for comparing the second and third control signals and selecting one of them based upon its relative value as compared with the other and for providing a fourth signal output indicative of the selected control value. This fourth signal control is then used to control the components of the refrigeration system which controls the concentration of the refrigerant absorbent solution supplied to the absorber. This complicated control system operates to reduce the fuel input to the refrigeration system whenever the fuel is being inefficiently used due to changes in internal operating temperatures or other criteria of the refrigeration system. Further, this complicated control system is designed to vary the output chilled water temperature in response to changes in load thereby further reducing fuel consumption of the refrigeration system.

All of the above discussed prior art control systems direct themselves to developing control devices of varying degrees of sophistication for regulating the operation of the absorption refrigeration system controlling parameters within the system itself. Even with these sophisticated internal controls, the system will often times generate excess chilled water for circulation throughout the building which has been lowered to a temperature below the comfort point thereby requiring auxiliary heating systems to automatically provide heat in order to compensate for the excessive cooling. In effect, the absorption type refrigeration system of the type used in large building complexes, relies upon an auxiliary heating system in order to provide comfortable conditioned air for an installation such as a large hospital.

None of the prior art devices to date have attempted to introduce a control signal directly to the absorption refrigeration system which controls the amount of refrigerant of chilled water produced as a function of outdoor air temperature and outdoor humidity. In other words, the prior art devices have failed to recognize that the absorption refrigeration system chilled water output is a function not only of the demands of the system's internal characteristics for generating a set quantity of chilled water but also a function of the outdoor humidity and outdoor temperature.

SUMMARY OF THE INVENTION

The control system contemplated in this invention simply interrupts the pneumatic signal controlling the demand of chilled water by utilizing a dual port direct acting controller to which are fed an outdoor humidity signal and an outdoor temperature signal. The chilled water demand then becomes a function of outside temperature, outside humidity, as well as the internal controls of the absorption system thereby providing an optimal decision value for the respective climatic range of conditions. By properly initially calibrating the dual port direct acting controller as well as the temperature and humidity sensor device, the control system of the present invention may be adapted for use with any absorption type refrigeration system.

The control system of the present invention operates to reduce fuel input to the refrigeration system due to changes in outside air temperatures and humidity. Further, the control system is designed to be used in conjunction with or without some of the prior art internal control systems for reducing fuel consumption by the absorption refrigeration system.

Accordingly, the primary object of the present invention is to avoid the demand for excessive cooling of the chilled water thereby avoiding the requirement of reheating of the chilled water in order to provide an appropriate comfort level within the building atmosphere controlled by the refrigeration system.

Another object of the invention is to provide an inexpensive control device which throttles the absorption refrigeration system's demand for chilled water and as a function of outside temperature and humidity thereby eliminating excessive cooling and reheating of the building's air supply.

It is a further object of this invention to provide a control device which does not impair the internally provided safety shutdown features essential to the operation of an absorption type refrigeration system.

It is a further object of the invention to provide a control device which incorporates selector switch means to enable returning the machine to normal operation and bypass the outside air temperature and humidity sensor controller.

These, as well as further objects and advantages of the control system according to the present invention will become more fully apparent from the following detailed description and annexed drawings of the preferred embodiments thereof.

BRIEF DESCRIPTION OF THE DRAWINGS

A better understanding of the present invention will be achieved upon reference to the accompanying specification and by reference to the following drawings wherein like numerals refer to like parts throughout, and in which:

FIG. 2 is a graph illustrating the pressure temperature curves for the lithium bromide solution at various points throughout the refrigeration cycle.

DETAILED DESCRIPTION OF THE PREFERRED EMBODIMENT

Figure 1:
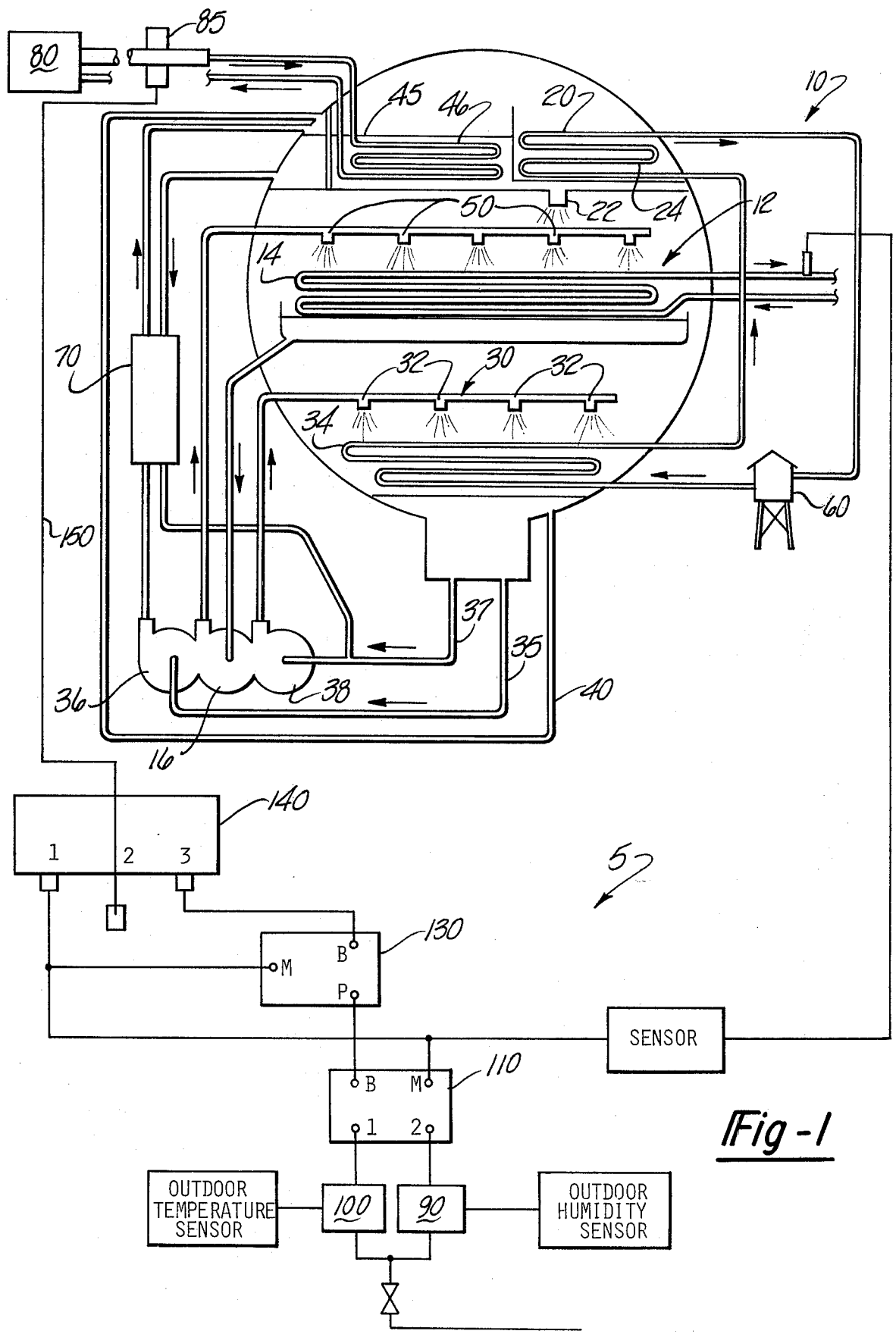
FIG. 1 is a partially diagramatic, a partially schematic view illustrating the preferred control system according to the present invention together with an absorption type refrigeration system whose operation is to be controlled.

Referring now to FIG. 1, the preferred control system 5 of the present invention is illustrated together with a conventional absorption type refrigeration system 10 whose operation is to be controlled. The conventional refrigeration system 10 is of the absorption type and includes an evaporator 12, condenser 20, absorber 30, and a concentrator 45.

In order to obtain a more complete understanding of the operation of the present invention, the operation of a conventional absorption type refrigeration system will first be described.

In operation, the fluid medium to be chilled is circulated through a coil 14 in the evaporator 12. Since the fluid medium is most commonly water, it will be assumed for purposes of this description that water (hereinafter referred to as the system water) is circulating through the coil 14. Those skilled in the art, however, will recognize that other liquids may also be employed.

A refrigerant enters the evaporator 12 from the condenser 20 through an orifice 22. The evaporator pressure is maintained at a low enough level to vaporize a portion of the refrigerant as it passes through the orifice 22. As the refrigerant vaporizes, it absorbs its latent heat of varporization thereby cooling and condensing the remainder of the refrigerant which collects at the bottom of the evaporator 12. The liquid refrigerant is then fed through an evaporator pump 16 to spray trees 50 which spray the refrigerant on the coil 14. This is desirable to insure that the coil 14 will be uniformly wetted by the refrigerant at all times.

As the refrigerant contacts the coil 14, it extracts heat from the water therein which has the dual effect of cooling the system water and causing the refrigerant to boil. The vaporized refrigerant then passes into the absorber 30 which is maintained at a pressure slightly lower than the pressure in the evaporator 12. In the absorber 30, an absorbent having a strong affinity for the refrigerant and a boiling point much higher than the refrigerant is sprayed through spray trees 32 onto the refrigerant vapor.

The most commonly used refrigerant-absorbent combination is water and lithium bromide (LiBr). Water is a preferred refrigerant since it possesses a high latent heat of vaporization which serves to minimize the amount of refrigerant necessary to provide a given amount of cooling. In addition, water has a low specific volume which serves to reduce the volume of the refrigerant which must be transported. Further, water has a working pressure near atmospheric which reduces the problem of leaks thereby lessening the cost of machine design and is safe, stable and readily available at low cost. Lithium bromide is preferred principally because with respect to water, it is an excellent absorbent.

In the absorber 30, the refrigerant vapor eminating from the evaporator condenses in the liquid lithium bromide solution to form a dilute solution which collects at the bottom of the absorber 30. The heat of condensation given up by the refrigerant during this process is removed by the condensing water which circulates through a coil 34 disposed in the absorber 30. The condensing water may come, for example, from a cooling tower 60. As shown, the dilute solution collected at the bottom of the absorber 30 passes out of the absorber in three controlled streams. One stream 35 passes into a pump 36 which pumps the solution into the concentrator 45. In the concentrator 45, the refrigerant is boiled out of the dilute solution thus producing a concentrated refrigerant-absorber solution, i.e. one that has a higher percentage concentration of absorbent than the dilute solution. The concentrated lithium bromide solution is then mixed with the second controlled stream of dilute solution 37. Mixed together, these solutions produce an intermediate refrigerant-absorbent solution, i.e. one in which the percentage of absorbent is somewhere between that found in the concentrated and the dilute solutions. This will be more fully explained hereinafter. The absorber pump 38 then pumps this intermediate solution into the absorber 30 through spray trees 32 as is more fully described above. A third controlled stream 40 is a heat exchanger bypass tube connecting the concentrator sump directly to the absorber, and serves to limit the solution level in the concentrator 45 by bypassing excess solution directly back to the absorber 30. A first function of this bypass tube is that at the time of startup, the solution level in the concentrator 45 has a tendency to rise until the pressure difference between the concentrator 45 and absorber 30 is established. During this initial stage of operation, the solution may flow through both the heat exchanger 70 and the heat exchanger bypass tube 40, holding the solution in the concentrator 45 at the design level. A second function of the bypass tube is to conduct the full flow of heated solution directly back to the absorber 30 should crystallization block the return passages of the heat exchanger. This direct return of hot solution to the absorber 30 increases the temperature of the dilute solution returning to the concentrator 45 through the tubes in the heat exchanger 70, providing the necessary heat to break up the crystals, freeing the blocked passages. The lower part of the bypass tube 40 remains filled with solution at all times, thereby forming a liquid seal between the high and lower pressure sides of the system.

It will be apparent that heat must be supplied to the dilute solution in the concentrator 45 to raise the temperature high enough to drive out the water vapor. Most commonly, as shown in FIG. 1, this is accomplished by circulating steam from a low pressure steam source 80 through a coil 46 disposed in the concentrator 45. The steam temperature being maintained at a value high enough to boil out the refrigerant yet below the boiling point of the absorbent. Typically, water will boil out of the dilute solution at about 210° F. while the boiling point of lithium bromide is about 1500° F. Consequently, the steam from source 80 is maintained at a temperature between these two values. The water vapor boiled out of the lithium bromide solution in the concentrator 45 migrates to the condenser 20 which is maintained at a slightly lower pressure than the pressure found in the concentrator 45.

A coil 24, through which cooling water is circulated, is disposed in the condenser 20. As shown, the water in the coil 24 is the same water which has first been circulated through the coil 34. This is done since, as will become more fully apparent hereinafter, the condenser is typically maintained a temperature of about 10° F. higher than the absorber temperature. After passing through the coil 24, the condensing water is returned to the tower 60 for recooling.

Upon contacting the coil 24, the vaporized refrigerant is cooled and condensed. The liquid refrigerant collects at the bottom of the condenser and eventually passes through the orifice 22 into the evaporator 12 thereby completing the refrigerant cycle.

Since the stream 35 of dilute solution must be heated in the concentrator 45 in order to drive out the refrigerant, and since the concentrated lithium bromide solution returned to the absorber 30 must be sufficiently cooled to maintain a constant absorber temperature, the system 10 will generally include a heat exchanger 70. As shown, the stream 35 of dilute solution passes through the heat exchanger 70 in one direction and a hotter concentrated solution passes through the heat exchanger 70 in the opposite direction. In the heat exchanger, the dilute solution takes on heat and, therefore, requires less heat input in the concentrator 45 from the steam source 80 while the concentrated solution gives up heat thus requiring less cooling in the absorber 32 to lower its temperature.

Referring now to FIG. 2, which graphically illustrates the pressure-temperature curves for water and lithium bromide, the changes in pressure and temperature that occur throughout the system 10 will be more fully described.

Assuming that the system 10 is to cool the system water to 45° F., the refrigerant must vaporize at a temperature of about 40° F. Thus, with reference to FIG. 2, the evaporator pressure must be maintained at approximately 6.5 MM Hg (Point 1). Since the evaporator pressure must be slightly higher than the absorber pressure to insure that the vaporized refrigerant passes to the absorber, the absorber is maintained at a pressure of approximately 6.0 MM Hg. Depending upon the temperature in the absorber, this pressure will exist for various concentrations of the lithium bromide solution. The absorber temperature, however, is directly depending upon the temperature of the water during the coil 34. Since the water in the cooling tower 60 is typically 85° F., which, assuming that the surface area of the coil 34 is kept at an economical level, means that the absorber temperature will be about 107° F., it may be seen from FIG. 2 that the concentration of the dilute solution in the absorber must be approximately 60 percent (Point 2) to keep the pressure in the absorber below the evaporator pressure. As the stream 35 of dilute solution passes out of the absorber 30, it first passes through the heat exchanger 70 where its temperature is raised to approximately 170° F. (Point 3). Thus, Point 3 represents the condition of the dilute solution as it enters the concentrator 45. In the concentrator 45, the steam from the source 80 passing through the coil 46 adds additional heat to the dilute solution until the vapor pressure of the solution reaches the condenser pressure at which point equilibrium is disrupted as some of the water molecules boiled out of the solution pass into the condenser 20.

In order to insure that water vapor will migrate from the concentrator 45 to the condenser 20 the pressure in the concentrator must be raised to a level slightly above the pressure in the condenser 20 which, in turn, is directly dependent on the condenser temperature. As noted above, the same water used to cool the absorber 30 is also used to cool the condenser 20. Thus, the temperature of the water entering condenser coil 24 will be at about 95° F., which means that the temperature in the condenser 20 will typically be approximately 115° F. At this temperature, the condensing pressure of the refrigerant is about 78 MM Hg. Therefore, when the vapor pressure of the 60 percent solution exceeds about 78 MM Hg, a portion of the water vapor molecules in the concentrator 45 will migrate to the condenser 20. As shown in FIG. 2, the pressure of the 60 percent solution entering the concentrator will reach 78 MM Hg at a temperature of approximately 195° F. (Point 4). Therefore, assuming that the heat transfer surface in the concentrator is to be maintained at an economical figure, the steam entering the coil 46 in the concentrator 45 must be at approximately 245° F.

For a fixed flow rate of dilute solution in the concentrator 45, the final concentration of the lithium bromide solution may be controlled by controlling the rate of steam flow into the concentrator 45. By maintaining the steam pressure at about 12 PSIG, the solution concentration at the output of the concentrator 45 will be approximately 65 percent. This is shown at Point 5, with the line 4–5 representing the latent vaporization of the refrigerant.

After passing through the heat exchanger 70 which reduces the temperature of the concentrated solution to approximately 135° F. (Point 6) the concentrated solution is mixed with the second stream 37 of dilute solution to produce an intermediate solution (Point 7). The intermediate solution is necessary for a number of reasons, the foremost of which is to prevent crystallization of the lithium bromide. With reference to FIG. 2, it can be seen that Point 6 is close to the crystallization line for lithium bromide. Consequently, if the concentrated solution were further cooled from this point without diluting its concentration, some crystallization would probably occur. Another reason is that by spraying a less concentrated solution on the coil 34, and hence a less viscous one, the surface of the coil 34 will be more completely wetted.

The reason the solution is concentrated to a high percentage concentration in the concentrator 45 and then diluted, is that the absorber 30 requires a higher rate of solution flow that the concentrator does. Thus, while the proper solution flow rate in the absorber 30 is maintained by recirculating a portion (stream 37) of the dilute solution, this necessitates overconcentrating the solution in the concentrator 45 in order that the intermediate solution sprayed on the coil 30 through spray trees 32 will have the proper orientation. Spraying the intermediate solution through the absorber trees 32 onto the coil 34 further cools the intermediate solution to a point 8 in FIG. 2. At this point, the intermediate solution has the capacity to absorb additional water (refrigerant) vapor molecules from the evaporator. The more water vapor absorbed by the intermediate solution, the more dilute it becomes, the limit being imposed by the cooling availability in the absorber 30. By maintaining the absorber temperature at approximately 105° F., the final concentration of the dilute solution will be about 60 percent (Point 2). As the solution passes over the absorber tube bundle, it is cooled and absorbs the refrigerant from the evaporator, as indicated by line 7-8-2.

Since the flow rate of the system water through the coil 14 is generally constant, it is necessary to maintain a given temperature and concentration of lithium bromide solution in the absorber 30 in order for the system 10 to produce a given amount of refrigeration. For example, assuming the concentration of the solution in the absorber 30 were reduced, the ability of the solution to absorb water vapor molecules migrating from the evaporator 12 would also be reduced which in turn would lower the refrigeration capacity of the system 10. On the other hand, if there is an increase in the concentration of the lithium bromide solution in the absorber 30, the solution will be capable of absorbing more water vapor molecules which, in turn, will increase the refrigeration capacity of the system.

As more fully described above, the concentration of the solution in the absorber is directly dependent upon the rate of flow of steam through the coil 46 in the concentrator 45. As the flow rate of the steam increases, more refrigerant is driven out of the dilute solution in the concentrator with the result that the final concentration of the solution leaving the concentrator 45 is increased. This in turn results in an increase in the concentration of the intermediate solution fed into the absorber 30 through the spray trees 32. On the other hand, a decrease in the flow rate of steam through the coil 46 serves to reduce the amount of refrigerant driven out of the dilute solution which results in a decrease in concentration of the solution leaving the concentrator 45. This in turn will result in a decrease in the concentration of the intermediate solution in the absorber 30.

It is, therefore, obvious that the cooling capacity of the machine may be controlled by regulating the concentration of the solution entering the absorber 30. This may be done, for example, by disposing a three way valve (not shown) on the line going to the concentrator 45; the valve may then be controlled to bypass the concentrator 45 and feed a portion of the dilute solution directly back to the absorber 30 thus reducing the concentration of the intermediate solution supplied to the absorber. Most commonly, however, this has been accomplished by disposing a single temperature sensor at the output of the cooling coil 14 in the evaporator. The output of this temperature sensor is used to control a throttling steam or hot water valve 85 which is placed on the input line of the coil 46. Should the temperature sensor detect a rise in the supply or system water temperture, the throttling valve 85 will be opened wider thereby increasing the heat input to the concentrator 45. As is more fully described above, this will result in an increase in the concentration of the intermediate solution which will increase the cooling capacity of the system 10. Conversely, if the temperature sensor detects a drop in the supply or system water temperature, the throttling valve 85 will be positioned to reduce the heat input to the concentrator 45 which results in the decrease in the concentration of the intermediate solution in the absorber 30. This in turn will decrease the cooling capacity of the system 10.

This type of capacity control, however, has a number of deficiencies. Specifically, it is designed to demand and maintain the supply or system water at a constant temperature regardless of the load requirement on the refrigeration unit. Thus, assuming the load on the system 10 decreases, which is reflected by a lower return water temperature, the supply or system water temperature will also tend to decrease. As is more fully described above, when the temperature sensor detects the drop in the supply or system water temperature, the control system will respond by reducing the amount of steam admitted to the system 10 thereby decreasing the concentration of the intermediate solution and reducing the cooling capacity of the system 10. Thus, it can be seen that the system will compensate for the reduced load by reducing the temperature differential between the supply or system water and the return water while maintaining the temperature of the supplier system water at a constant low level. From a fuel consumption point of view, this is wasteful since additional energy (steam) is required to hold a stable chilled water temperature although the load on the system 10 has decreased.

Accordingly, the absorption cold generator is designed to hold a stable chilled water temperature over a wide range of load conditions. This, however, as indicated above is wasteful, in that, although the system when in use, is designed to require a set chilled water temperature, it ignores outdoor air and humidity conditions which greatly affect the load conditions on the system thereby many times causing overcooling of the chilled water and subsequently requiring reheating of this overcooled air supply in order to keep the building ambient requirements at a comfortable level.

Referring now again to FIG. 1, the fuel conservation control system 5 will now be described.

As shown, the preferred system 5 includes an outdoor humidity sensor 90, an outdoor air temperature sensor 100, a direct acting dual input controller 110, a manual minimum positioning switch 130, and a manual three way, two position positive acting air switch to divert flow from one branch line to another.

While the components of the control system 5 may be pneumatic, hydraulic, fluidic, electronic, electric, or any combination thereof, the preferred system 5 described herein is pneumatic. Accordingly, each of the sensors 90, 100 is a transducer whose output is a pneumatic signal proportional to the sensed temperature and humidity.

As shown, the control system is designed to interrupt the signal of the temperature sensor at the output of the cooling coil 14 which is used to control the throttling valve 85.

In order to understand the mode of operation of the present invention, it is first necessary to recognize that from FIG. 2, the lithium bromide solution used in the absorption refrigeration system is subject to crystallization under certain conditions. This is clearly indicated in FIG. 2 by the line indicated as the saturation line. It is essential that all operating points throughout the complete cycle be maintained above this line otherwise crystallization of the lithium bromide will occur. In other words, the figure shows at what temperatures and vapor pressures the solution can be expected to begin crystallizing. If the solution equilibrium point falls on this saturation line, the solution is fully saturated. This means that the solution contains as much lithium bromide as it possibly can without lithium bromide crystals forming and precipitating out. If water were removed from such a solution or if the solution were allowed to cool, salt crystals would form.

Crystallization is of very special concern when power failure occurs and the machine cannot operate through its normal dilution cycle. Then, as the concentrated lithium bromide solution cools, the equilibrium point changes along a given concentration line. If the equilibrium point falls below the saturation line, crystallization will occur. Ambient temperature within the system and solution concentration are the determining factors.

As explained above, equilibrium is disrupted by applying heat to the dilute solution in the concentrator 45 to raise its vapor pressure to or above the condensing pressure, thereby disrupting the equilibrium. At this point, the number of water vapor molecules leaving the solution is greater than the number of water vapor molecules re-entering the solution because the water vapor leaving the solution is no longer confined. It can pass into the condenser 20. The temperature and vapor pressure at which equilibrium is disrupted is determined by the pressure and temperature in the condenser section. When the concentrators' solution pressure becomes greater than the condensing pressure, water vapor begins to leave the lithium bromide solution and pass into the condenser.

In order to prevent crystallization, the machine has built-in safety shut down features. One of said features being a minimum position switch which dictates the minimum pressure deliverable by the throttling steam valve 85 in order to prevent the valve from delivering less than a minimum determined amount of steam to the concentrator thereby avoiding crystallization as a result of insufficient heating of the concentrators' solution. This minimum pressure is a function of the machine operation and is normally provided to the user of the machine by the manufacturer. In the preferred embodiment, it is known that the steam valve may not be allowed to drop below providing five pounds of steam in order to avoid crystallization. Accordingly, the minimum position switch used in the control system is preset to approximately one pound higher than the machine safety shut down feature of five pounds. In other words, the minimum position switch 130, regardless of the signal it receives from the direct acting dual input controller, will never be allowed to generate a signal to the steam valve less than six pounds pressure. Therefore, if it is desired to bypass the control means of the present invention, the manual selector switch 140 is connected between pole 1 and 2 which allows the steam valve operation to be a function of the chilled water temperature sensed directly in coil 14 with the provision that the machine branch conduit or inlet signal port 150 pressure will never be below the safety minimum signal that is built into the machine operation. The safety minimum operational presettings within the normal machine operation can never be overridden by the control device.

When it is desired to conserve fuel during operation of the absorption refrigeration system, the manual selector of switch 140 is closed between poles 2 and 3 thereby bringing into operation the direct acting dual input controller and outdoor temperature and humidity sensors. Again, under this condition, the control system is elected to provide an inlet signal to the steam valve which is a function of outdoor temperature and outdoor humidity as well as chilled water temperature which can never be lower than the predetermined minimum signal of 6 pounds preset in the minimum position switch 130.

When the fuel conservation control system is in use, the controller 110 has the outdoor temperature sensor 100 connected to port 1 and the outdoor humidity sensor 90 connected to port 2 of the controller 110, as shown in FIG. 1. Both of these sensors are provided with a main pressure source for proper operation with external restrictors. The temperature sensor works on the force balance principle wherein two forces oppose one another until both are equal in balance. In the sensor, these forces are bimetal forces trying to close a flapper down over a nozzle and the air pressure in a nozzle chamber trying to hold the flapper up. As the temperature increases, the bimetal strip exerts a downward force on a lever, causing a small movement toward the nozzle. This closing off of the nozzle obstructs the flow of air thereby increasing the pressure within the nozzle's chamber and feedback chamber. The bellows exert an upward force on a main lever, opposing the downward force caused by the temperature increase. When these two forces are in balance, the increased sensing pressure is transmitted back to the controller, reflecting a linear relationship between temperature and pressure. A decrease in temperature reverses the above operation and reduces the pressure to a new position of equilibrium. An example of this type of component of the control system may comprise, for example, Honeywell Model LP 914A or LP 915A pneumatic temperature sensors. Likewise, the humidity sensor used in the invention measures the relative humidity at the point of mounting of the element. The sensors use nylon as the humidity measuring element and are provided with compensation for the effects of measuring at various temperatures. Again, the humidity sensor operates on a force balance principle wherein the upward force acting on a main lever from a nylon element acts through a linkage and the pressure in a chamber acting on a flapper are balanced by a tension spring and a compression spring. Upon an increase in humidity, the nylon element expands relieving tension on the linkage and allows the main lever and flapper to move closer to a nozzle. This causes the pressure in the chamber to increase, rebalancing the forces on the main lever and increasing the output pressure in the sensor line. Upon a decrease in humidity, the nylon element contracts, thereby increasing the tension on the linkage and compression spring resulting in a reduced pressure in the chamber and in the sensor line. Such a humidity sensor may comprise, for example, Honeywell Pneumatic Humidity Sensor Model No. HP 971A.

The direct acting dual input controller 110 is also conventional and may, for example, be Honeywell direct acting dual input Model RP 908B. The controller is a pneumatic amplifier which takes a small pressure change from a sensor and amplifies it into a predetermined branch line output pressure. The controller acts on a change of sensor pressure, regardless of what the control variable is.

In the dual direct acting controller 110, the main signal is supplied through the "M" port to the valve unit, sensor line, and sensor "1" chamber. The main signal supply in this embodiment is the temperature sensor of the bulb in the chilled water cooling coil 14 output. On an increase in outside temperature, as measured by the temperature sensor, pressure in both the sensor line and the sensor chamber increases. The increased pressure in the chamber exerts a force on the main lever causing it to rotate clockwise about its pivot point. The force on the main lever acts on the proportional band lever through the proportional band adjustment, causing the proportional band lever to rotate counterclockwise about the direct acting proportional band lever pivot point. This force supplied to the proportional band lever forces the flapper operating arm upwards, causing the flapper to rotate clockwise about its pivot point. The main nozzle opens, increasing the pressure in the feedback chamber and the branch line. Increased pressure in the feedback chamber rebalances the forces acting on the main lever and the main nozzle closes. The resulting branch line pressure change then actuates the final control element which, in this case, through the minimum position switch 130 is the steam valve 85.

A decrease in temperature results in a decreased pressure in the sensor line and the sensor's chamber. Since the forces of the set point spring and the feedback chamber are now greater than the decreased chamber pressure, the main lever rotates counterclockwise, giving rise to a series of lever movements opposite in direction to those described above. As an end result, the flapper moves counterclockwise to open the exhaust nozzle. Reduced pressure to the feedback chamber and the branch line are the result of the nozzle opening. Reduced pressure in the chamber moves the flapper clockwise to close the exhaust and to oppose any further movement of the main lever.

The dual input controller can also be adapted into a reverse acting device by moving the proportional band pivot screw to the reverse acting position and to attach the reverse acting springs to the spring posts. The operation of the device then is exactly the reverse as that described above.

It can readily be seen by those skilled in the art by providing the proper proportional band setting and set point, the controller signal output at port B which is applied to the steam valve 85 can be readily made a function of the outdoor temperature and outdoor humidity. For purposes of the preferred embodiment, the outdoor temperature sensor can be preset to permit more steam to be delivered to the steam valve as the temperature outdoors increases, thereby increasing the cooling capacity of the machine. Likewise, the outdoor humidity sensor would permit more steam to be delivered through the minimum position switch to the steam valve 85 as the outdoor humidity increases. An example of operation, with the fuel conservation unit, is as follows. If outdoor air temperature is 75° F., and the outdoor humidity is 35 percent, the fuel conservation unit is preset to allow approximately 8 psi signal to activate the steam valve, thus raising the chilled water temperature to 58° F. If outdoor air remained at 75° F. and the outdoor humidity rose to 70 percent, the fuel conservation unit would allow a higher pressure signal to the steam valve through the combination of the controller and minimum position switch thereby lowering the chilled water temperature to 52° F. to permit more cooling. A 35 percent drop in humidity sensed by the humidity sensor is seen by the controller as a requirement to provide one less P.S.I. of signal on the controller thereby permitting a higher chilled water temperature. (The adjustment on the controller is preset for outdoor humidity at 10 percent of its sensed signal and the proportional band is preset at 14 percent. Therefore, for each approximate 40 percent increase in outdoor humidity, the controller through its presetting will recognize this change as an additional output signal of approximately 1 P.S.I. on the controller to provide additional cooling. Likewise, a 40 percent drop in humidity outdoors will lessen the demand signal on the controller by 1 P.S.I. Accordingly, permitting the chilled water temperature to rise approximately 6° F. before demanding more steam to keep the absorption refrigeration machine responsive to satisfy indoor requirements). Accordingly, a rise in outdoor air temperature would result similarly in lowered chilled water temperature (demand more steam to be delivered to concentrator 45) while a drop in outdoor air temperature would permit the chilled water temperature to rise without the need of operating the steam valve, ergo, the fuel conservation.

It is understood by those skilled in the art that the above figures are examples and are all adjustable at the controller and the minimum position switch. The general concept being that the fuel conservation unit lowers the pressure signal received by the steam valve as a result of lowering outdoor air and outdoor humidity thereby reducing steam requirement from the steam source and permitting the chilled water temperature to rise. If outdoor air and humidity call for more cooling, the fuel conservation unit regulates the pressure signal generated at the output B of the direct acting controller to provide a higher pressure to a steam valve and in turn, cooler, chilled water output would be generated. Again, it must be understood by those skilled in the art that the settings cover a wide temperature span. Also, the calibrations are adjustable and can produce any desired cooling needs. Once set for individual needs, the fuel conservation unit needs no further adjustment. In effect, it becomes the main controller for the absorbtion refrigeration machine.

Thus, as opposed to a conventional controller in which a signal transmitter is disposed in the supply water line and the signal from the transmitter operates the steam valve 85 to maintain the supply water temperature at a constant value, the control system 5 of the present invention, by sensing the outdoor temperature and humidity, anticipates load changes on the system 10 as a result of external temperature and humidity elements and allows the supply pressure line 150 to the steam valve to seek out proportional values in which the system 10 will once again be in equilibrium.

Under the conditions of the control system 5, energy is conserved by providing a demand signal to the steam valve which in effect "lies" with respect to the demand of the sensor bulb in the chilled water cooling coil 14 output. This so called "lie" is generated in the controller by the effect of the outdoor temperature and humidity sensors acting through the dual input direct acting controller upon the sensed temperature sensor bulb signal in the cooling system coil 14 which is then supplied to the output or the controller and thereafter to the steam valve 85.

All the components of the control system 5 illustrated in FIG. 1 are conventional as set forth above. Again, to repeat, the outdoor temperature sensor may comprise, for example, Honeywell Model Lp 914A; the pneumatic humidity sensor may comprise, for example, Honeywell Model P 971A; the direct acting dual input controller may comprise Honeywell Model RP 908B; the minimum positioning switch may comprise Honewell manual-minimum positioning switch SP 93A or SP 970A; and the manual selector switch may comprise Honeywell Toggle Switch Model 802550.

Normally, the throttling steam valve 85 will be part of the refrigeration system 10 whose operation is to be controlled. In the event the control system 5 is pneumatic, for example, and throttling valve 85 is an electrically operated valve, the output pressure signal from the control system could first be fed to a suitable signal transducer which would convert this pressure signal to a suitable electrical signal. The output from the transducer can then be used to control the throttle valve 85.

In those refrigeration systems which employ, for example, a boiler to generate steam which is then fed into the concentrator 45, the output from the control system instead of controlling the throttle valve 85 could be directly used to control the heat input into the boiler. In fact, it is contemplated that the output of the control system 5 be used to control whatever means are employed to control the capacity of the refrigeration system.

Also, numerous other components other than those illustrated in FIG. 1 may be employed to affect the type of control described above. Thus, it should be recognized that the components of the control system 5 illustrated in FIG. 1, as well as their arrangements are merely exemplary of the many different components which may be employed to affect the type of control described above.

Skilled art workers will immediately recognize that the initial calibration of the temperature sensor, humidity sensor, minimum position switch, and direct acting dual input controller, will be dependent upon the particular refrigeration system in connection with which the control system 5 of the present invention is employed. Thus, it should be understood that the values given in the above detailed description are strictly exemplary. Since these and other changes and modifications are within the scope of the present invention, the above description should be construed as illustrative and not in a limiting sense.

What is claimed is:

1. A control system for controlling the refrigeration capacity of a refrigeration system in operative relation to control the temperature of a fluid medium for the climate control of building air in response to outdoor air temperature and humidity variations, said refrigeration system comprises a refrigerant; an absorbent having an affinity for said refrigerant; evaporator means for bringing said refrigerant into heat transfer relationship with said fluid medium, said evaporator means having an inlet for receiving said fluid medium to be cooled and an outlet for discharging cooled fluid medium from said evaporator means; absorber means connected to said evaporator means for flow communication therebetween, said absorber means further removing refrigerant vapors from said evaporator means; means for supplying a concentrated absorbent-refrigerant solution to said absorber means; means for cooling said absorber means to maintain the pressure therein below the pressure in said evaporator means whereby said refrigerant vapor flows to said absorber means to combine with said concentrated solution to produce a dilute solution; concentrator means for heating and removing a portion of said refrigerant from said dilute solution to form a vapor so as to control the temperature of said fluid medium and to produce a concentrated solution for recirculation to said evaporator means, said concentrator means further having heat source means and valve means for controlling said heat source means, said valve means having an inlet signal port, said inlet signal port having operatively connected to said valve means to activate said valve means, means for generating a first signal responsive to variations in the temperature of said fluid medium; means for generating a second signal at a predetermined level; minimum position switch means connected to said inlet signal port for terminating the operative effect of said first signal when said first signal is less than said second signal; means for supplying dilute solution to said concentrator means for controlling the concentration of said concentrated solution supplied to said absorber means; said system further comprising:

means for generating a third signal responsive to variations in outdoor air temperature;

means for generating a fourth signal responsive to variations in outdoor air humidity; and controller means, connected to said first, third and fourth signals for providing a fifth signal as a function of said first, third and fourth signals, said fifth and said second signals further being connected to said minimum position switch means further selecting the greater of said fifth and second signals dependent on its relative value as compared to the lesser of said fifth and second signals and providing a control signal indicative of said one selected signal, said control signal connected to said inlet signal port of said valve means to control said heat means in said concentrator in response to variations in sensed outside air temperature and humidity.

2. A control system as claimed in claim 1 further comprising:

selector switch means disposed adjacent to said refrigeration system, said selector switch means having a first input connected to said first signal, a second input connected to said control signal and mounted adjacent to said first input, a first output connected to said inlet port of said valve means to control said heat source means in said concentrator means and means for selectively connecting said first input to said first output for operative communication therebetween in one position of said selector switch means and for selectively connecting said second input to said first output for operative communication therebetween in another position of said selector switch so that in said one position of said selector switch means, said valve means controls said heat source means in response to variations in the temperature of said fluid medium and in said another position of said selector switch, said valve means controls said heat source means in response to variations in the outside air temperature and outside air humidity.

3. A control system as claimed in claim 2 further comprising a pneumatic source means, connected to said first, second, third, and fourth means for providing a source of pressure to operate said first, second, third and fourth means.

4. A control system as claimed in claim 3 wherein said second means further comprises a first pneumatic temperature sensor.

5. A control system as claimed in claim 3 wherein said second means further comprises a pneumatic humidity sensor.

6. A control system as claimed in claim 1 wherein said first controller means further comprises:

a housing having a first inlet, a second inlet adjacent to said first inlet, a third inlet adjacent to said second inlet and a first outlet adjacent said third inlet, said first inlet connected to said first signal, said second inlet connected to said fourth signal, said third inlet connected to said third signal and said first output connected to said minimum position switch means whereby the temperature of said fluid medium is controlled in response to variations in the sensed outside air temperature and humidity.

7. A control system as claimed in claim 3 wherein said first means further comprises a second pneumatic temperature sensor.

8. A control system as claimed in claim 3 wherein said third signal rises when said sensed outside air temperature rises and said third signal falls when sensed outside air temperature falls.

9. A control system as claimed in claim 3 wherein said fourth signal rises when said sensed outside air humidity rises and said fourth signal falls when said outside air humidity falls.

10. In a control system for controlling the refrigeration capacity of an absorption refrigeration apparatus in operative relation to control the temperature of a fluid medium for the climate control of building air in response to outdoor air temperature, said refrigeration apparatus having a concentrator, a condenser connected to said concentrator, an evaporator connected to said condenser and an absorber connected to said evaporator and to said concentrator for flow communication therebetween to provide a continuous cycle absorption system wherein an absorbent having an affinity for said refrigerant is mixed together to produce an absorbent solution for circulation through said apparatus, said concentrator having heating means for heating said absorbent solution and valve means for regulating said heating means, said valve means having an inlet signal port to control said valve means, said inlet signal port being connected to said valve means to activate said valve means, means for generating a first signal responsive to variations in the temperature of said fluid medium; means for generating a second signal at a predetermined level; minimum position switch connected to said inlet signal port; means for terminating the operative effect of said first signal when said first signal is less than said second signal, wherein the improvement comprises:

means for generating a third signal in response to variations in outside air temperature; and controller means connected to said first and third signals for providing a fifth signal as a function of said first and third signals, said fifth and second signals being connected to said minimum position means, said minimum position means further selecting the greater of said second and fifth signals dependent on its relative as compared with the lesser of said second and fifth signals and for providing said control signal indicative of the greater of said selected signals, said control signal operatively connected to said inlet signal port of said valve means to control said heat source means in said concentrator means in response to the greater of said selected output signals from said first and said third signal generating means.

11. In a control system for controlling the refrigeration capacity of an absorption apparatus in operative relation to control the temperature of a fluid medium for the climate control of building air in response to outdoor air temperature and humidity variations, said refrigeration apparatus having a concentrator, a condenser connected to said concentrator, an evaporator connected to said condenser and an absorber connected to said evaporator and to said concentrator for flow communication therebetween to provide a continuous cycle absorption system wherein an absorbent having an affinity for said refrigerant is mixed together to produce an absorbent solution for circulation through said apparatus, said concentrator having heating means for heating said absorbent solution and for removing a portion of said refrigerant from said absorbent solution and valve means for regulating said heating means, said valve means having an inlet signal port to control said valve means, said inlet signal port being connected to said valve means to activate said valve means, means for generating a first signal responsive to variations in the temperature of said fluid medium; means for generating a second signal at a predetermined level; minimum position switch means connected to said inlet signal port for terminating the operative effect of said first signal when said first signal is less than said second signal, wherein the improvement comprises:

means for generating a third signal in response to variations in outside air temperature;

means for generating a fourth signal in response to variations in ambient air humidity; and controller means, connected to said first, third and fourth signals for providing a fifth signal as a function of said first, third and fourth signals, said fifth and said second signals further being connected to said minimum position switch means, said minimum position switch means further selecting the greater of said fifth and second signals dependent on its relative value as compared to the lesser of said fifth and second signals and providing a control signal indicative of said one selected signal, said control signal connected to said inlet signal port of said valve means to control said heat means in said concentrator in response to variations in sensed outside air temperature and humidity whereby said valve means controls said heat source means in said concentrator means and thereby controls said outlet temperature of said fluid medium in response to outside air temperature and humidity.

12. The combination as claimed in claim 11 further comprising:

selection switch means disposed adjacent to said refrigeration apparatus, said selection switch means having a first input connected to said first signal, a second input connected to said control signal and mounted adjacent to said first input, a first output connected to said inlet signal port of said valve means to control said heat source means in said concentrator means and mounted adjacent to said first and second inputs, and means for selectively connecting said first input to said first output for operative engagement therebetween in one position of said selector switch means and for selectively connecting said second input to said first output for operative engagement therebetween in another position of said selector switch means so that in said one position of said selector switch said valve means controls said heat source means in response to variations in said temperature of said fluid medium and in said other position of said selector switch, said valve means controls said heat source in response to variations in the outside air temperature and outside air humidity.

13. A method of controlling an absorption refrigeration apparatus in operative relation to control the temperature of a fluid medium for the climate control of building air in response to outdoor air temperature and humidity variations, said apparatus having a concentrator, a condenser mounted adjacent to said concentrator, an evaporator connected to said condenser, and an absorber connected to said condenser and said concentrator to provide a continuous cycle absorption system, said absorption system having an absorbent solution and a refrigerant circulated through said system and wherein relatively dilute solution is transferred to said concentrator, said concentrator having heating means for heating said relatively dilute solution in said concentrator to release said refrigerant vapor to said condenser and valve means connected to said heating means for controlling said heating means, said valve means having inlet signal port to activate said valve means and wherein refrigerant vapor is condensed in said condenser and said condensed vapor from said condenser is transferred to said evaporator where the condensed vapor is brought in direct contact with said fluid medium supplied to a load, and wherein the condensed vapor released in said evaporator is absorbed by absorbent solution in said absorber, thereby diluting the absorbent solution and wherein a relatively concentrated solution is transferred from said concentrator to said absorber to maintain the absorbent solution at an effective concentration level, said method comprising the steps of:

sensing variations in the temperature of said fluid medium and providing a first signal responsive to variations in said sensed temperature variations in said fluid medium;

generating a second signal at a predetermined level;

terminating the operative effect of said first signal when said first signal is less than said second signal;

sensing variations in the temperature of the outdoor air and providing a third signal indicative of said sensed outside air temperature variations;

sensing variations in the humidity of the outdoor air and providing a fourth signal indicative of said sensed outdoor air humidity variations;

connecting said first, third and fourth signals and providing a fifth signal as a function of said first, third and fourth signals;

coupling said fifth signal and said second signal to a minimum position switch to select the greater of said fifth and second signals dependent on its relative value as compared to the lesser of said fifth and second signals and providing a control signal indicative of said one selected signal; and connecting said control signal to said input signal port of said valve means to control said heat means in said concentrator in response to variations in sensed outside air temperature and humidity.

14. A method as claimed in claim 13 further comprising the steps:

connecting said control signal and said first signal to a selector switch having an actuator lever, a first input connected to said first signal, a second input connected to said control signal and mounted adjacent to said first inlet, a first output connected to said input signal port of said valve means to control said heat source means in said concentrator; and positioning said actuator lever selectively for connecting said first input to said first output for operative communication therebetween in one position of said actuator lever and selectively connecting said second input to said first output for operative communication therebetween in another position of said actuator lever so that in said one position of said selector switch, said valve means controls said heat source means in response to variations in the temperature of said fluid medium and in said another position of said selector switch, said valve means control said heat source means is a function of variations in the sensed outside air temperature, outside air humidity, and the temperature of said fluid medium.

15. In a method of controlling an absorption refrigeration apparatus in operative relation to control the temperature of a fluid medium for the climate control of building air in response to outdoor air temperature and humidity variations, said apparatus having a concentrator, a condenser mounted adjacent to said concentrator, an evaporator connected to said condenser, and an absorber connected to said condenser and said concentrator to provide a continuous cycle absorption system, said absorption system having an absorbent solution and a refrigerant circulated through said system and wherein relatively dilute solution is transferred to said concentrator, said concentrator having heating means for heating said relatively dilute solution in said concentrator to release said refrigerant vapor to said condenser and valve means connected to said heating means for controlling said heating means, said valve means having an inlet signal port to activate said valve means and wherein the refrigerant vapor is condensed in said condenser and said condensed vapor from said condenser is transferred to said evaporator where the condensed vapor is brought into indirect contact with said fluid medium supplied to a load, and wherein the condensed vapor released in said evaporator is absorbed by absorbent solution in said absorber, thereby diluting the absorbent solution, and wherein a relatively concentrated solution is transferred from said concentrator to said absorber to maintain the absorbent solution at an effective concentration level, said method of controlling having the steps of:

sensing variations in the temperature of said fluid medium and providing a first signal responsive to variations in said sensed temperature variations in said fluid medium; and generating a second signal at a predetermined level; and terminating the operative effect of said first signal when said first signal is less than second signal, wherein the improvement comprises the steps of:

sensing variations in the temperature of the outdoor air and providing a third signal indicative of said sensed outside air temperature variations;

sensing variations in the humidity of the outdoor air and providing a fourth signal indicative of said sensed outside air humidity variations;

connecting said first, third and fourth signals and providing a fifth signal as a function of said first, third and fourth signals;

coupling said fifth signal and said signal to a minimum position switch to select the greater of said fifth and second signals dependent on its relative value as compared to the lesser of said fifth and second signals and providing a control signal indicative of said one selected signal; and connecting said control signal to said input signal port of said valve means to control said heat means in said concentrator in response to variations in sensed outside air temperature and humidity.

16. A method as claimed in claim 15 further comprising the steps:

connecting said control signal and said first signal to a selector switch having an actuator lever, a first input connected to said first signal, a second input connected to said control signal and mounted adjacent to said first input, a first output connected to said input signal port of said valve means to control said heat source means in said concentrator; and positioning said actuator lever selectively for connecting said first input to said first output for operative communication therebetween in one position of said actuator lever and selectively connecting said second input to said first output for operative communication therebetween in another position of said actuator lever so that in said one position of said selector switch, said valve means controls said heat source means in response to variations in the temperature of said fluid medium and in said another position of said selector switch, said valve means controls said heat source means is a function of variations in the sensed outside air temperature, outside air humidity and the temperature of said fluid medium.

17. A control system for controlling the refrigeration capacity of a refrigeration system in operative relation to control the temperature of a fluid medium for the climate control of building air in response to outdoor air temperature and humitidity variations, said refrigeration system comprising:

a source of refrigerant;

evaporator means for vaporizing said refrigerant and causing said refrigerant vapor into heat transfer relationship with said fluid medium to be cooled, said evaporator means having an inlet for receiving said fluid medium to be cooled and an outlet for discharging cooled fluid medium from said evaporator means;

condensing means for causing said refrigerant into heat transfer relationship with a cooling medium which extracts heat from the refrigerant vapor thereby condensing said refrigerant vapor to liquid form;

refrigerant distribution means operatively communicating with said condenser means to raise the pressure of said refrigerant vapor, said refrigerant distribution means further communicating with said evaporator means to receive said refrigerant vapor therefrom, said refrigerant distribution means further having refrigerant control means said refrigerant control means comprising:

means for generating a first signal responsive to variations in the temperature of said fluid medium for the climate control of building air;

means for generating a second signal at a predetermined level;

minimum position switch means connected to said refrigerant control means for terminating the operative effect of said first signal means when said first signal is less than said second predetermined signal;

means for generating a third signal responsive to variations in outdoor ambient air temperatures, said third signal being communicated to said refrigerant control means;

means for generating a fourth signal responsive to variations in outdoor ambient air humidity, said fourth signal being communicated to said refrigerant control means; and controller means connecting said first, third and fourth for providing a fifth signal as a function of said first, third and fourth signals, said fifth and second signals further being connected to said minimum position switch means for controlling said refrigerant distribution means, said minimum position switch further selecting the greater of said fifth and second signals dependent on its relative value as compared to the lesser of said fifth and second signals to control the refrigeration distribution means thereby controlling said refrigeration distribution means as a function of outdoor ambient air temperature and humidity.

* * * * *

UNITED STATES PATENT AND TRADEMARK OFFICE
CERTIFICATE OF CORRECTION

PATENT NO. : 4,322,951
DATED : April 6, 1982
INVENTOR(S) : Vincent J. Alfano

It is certified that error appears in the above—identified patent and that said Letters Patent is hereby corrected as shown below:

Column 2, line 31, delete "applied" and insert - - - supplied - - -.

Column 7, line 4, delete "during" and insert - - - entering - - -.

Column 13, line 1, delete "psi" and insert - - - P.S.I. - - -.

Column 13, line 51, delete "absorbtion" and insert - - - absorption - - -.

Column 14, line 10, delete "Lp 914A;" and insert - - - LP 914A; - - -.

Column 19, line 7, delete "inlet," and insert - - - input, - - -.

Column 19, line 7, delete "input" and insert - - - inlet - - -.

Column 20, line 20, delete "input" and insert - - - inlet - - -.

Column 20, line 41, delete "humitidity" and insert - - - humidity - - -.

Column 20, line 52, delete "the" and insert - - - said - - -.

Column 20, line 60, delete "means" and insert - - - means, - - -.

UNITED STATES PATENT AND TRADEMARK OFFICE
CERTIFICATE OF CORRECTION

PATENT NO. : 4,322,951
DATED : April 6, 1982
INVENTOR(S) : Vincent J. Alfano

It is certified that error appears in the above—identified patent and that said Letters Patent is hereby corrected as shown below:

Column 20, line 66, delete "level;" and insert - - - level, said generator means comprising: - - -.

Signed and Sealed this

Sixteenth Day of August 1983

[SEAL]

Attest:

Attesting Officer

GERALD J. MOSSINGHOFF

Commissioner of Patents and Trademarks